United States Patent
He et al.

(10) Patent No.: US 12,307,044 B1
(45) Date of Patent: May 20, 2025

(54) TOUCH DETECTION CIRCUIT

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/409,812

(22) Filed: Jan. 11, 2024

(51) Int. Cl.
*G06F 3/041* (2006.01)

(52) U.S. Cl.
CPC ................... *G06F 3/0418* (2013.01)

(58) Field of Classification Search
CPC .......................................... G06F 3/0418–04186
See application file for complete search history.

(56) References Cited

U.S. PATENT DOCUMENTS

| | | | |
|---|---|---|---|
| 11,132,091 B2 * | 9/2021 | Kim | G06F 3/04166 |
| 11,989,373 B2 * | 5/2024 | Lin | H03K 17/6871 |
| 2020/0220543 A1 * | 7/2020 | Chang | H03K 17/962 |
| 2022/0334703 A1 * | 10/2022 | Lin | H03K 17/6871 |

* cited by examiner

*Primary Examiner* — Gene W Lee
(74) *Attorney, Agent, or Firm* — JCIPRNET

(57) ABSTRACT

A signal receiver includes a signal receiving line, a signal processing circuit and a compensation circuit. The signal receiving line receives a driving signal through a first capacitor and is coupled to a plurality of display pixel circuits through a second capacitor. The signal processing circuit is coupled to the signal receiving line, receives a received signal on the signal receiving line and generates a touch detection information according to the received signal. The compensation circuit is coupled to the signal receiving line, generates a first compensation current according to driving currents of the display pixel circuits, generates a second compensation current according to sinking currents of the display pixel circuits, and generates a compensation signal according to the first compensation current and the second compensation current.

17 Claims, 4 Drawing Sheets

TOUCH DETECTION CIRCUIT

BACKGROUND

Technical Field

The disclosure relates to a touch display device and a signal receiver of a touch detection circuit thereof, and more particularly, to the touch display device and the signal receiver which can reduce noise on a received signal of the signal receiver caused by a display device.

Description of Related Art

In today's electronic products, touch detection circuits are essential circuits for most products. As electronic products become thinner and lighter, the distance between touch panels and display panels is getting closer and closer. Noise is getting louder and louder, and the touch circuit is more susceptible to interference. Please refer to FIG. 1, which illustrates a schematic diagram of a touch display device of prior art. The touch display device 100 includes a touch detection circuit and a display device. In the touch display device 100, a plurality of signal receivers RX_1 to RX_M of the touch detection circuit are respectively coupled to a power line ELVDD through a plurality of capacitors C_TP. The power line ELVDD is also coupled to a plurality of display pixel circuits DPC1 to DPCN of the display device, wherein each of the display pixel circuits DPC1 to DPCN includes a storage capacitor CDD. During a display operation, the display pixel circuits DPC may respectively display images with different luminous. Source drivers of the display device can charge the storage capacitors CDD, and charge energies may be coupled to the power line ELVDD through the storage capacitors CDD. Such as that, a noise NS1 can be generated on the power line ELVDD by the coupling effect. In FIG. 1, the noise N1 on the power line ELVDD=(DPC1*CDD)+ (DPC2*CDD)+ . . . + (DPCN*CDD)/(CDD*N+E_CAP), wherein the capacitor E_CAP is coupled between the power line ELVDD and a reference ground end GND. Since there are capacitors C_TP coupled between the signal receivers RX_1 to RX_M and the power line ELVDD, the noise N1 may be coupled to the signal receivers RX_1 to RX_M to interference touch detection signals thereof.

SUMMARY

The disclosure provides a touch display device and a signal receiver of a touch detection circuit thereof which can reduce noise on a signal receiving line of the touch detection circuit.

The signal receiver includes a signal receiving line, a signal processing circuit and a compensation circuit. The signal receiving line receives a driving signal through a first capacitor and is coupled to a plurality of display pixel circuits through a second capacitor. The signal processing circuit is coupled to the signal receiving line, receives a received signal on the signal receiving line and generates a touch detection information according to the received signal. The compensation circuit is coupled to the signal receiving line, generates a first compensation current according to driving currents of the display pixel circuits, generates a second compensation current according to sinking currents of the display pixel circuits, and generates a compensation signal according to the first compensation current and the second compensation current.

The touch display device includes a display device and a touch detection device. The display device includes a plurality of display pixel circuits. The touch detection circuit includes a plurality of signal receivers. Each of the signal receivers includes a signal receiving line, a signal processing circuit and a compensation circuit. The signal receiving line receives a driving signal through a first capacitor and is coupled to a plurality of display pixel circuits through a second capacitor. The signal processing circuit is coupled to the signal receiving line, receives a received signal on the signal receiving line and generates a touch detection information according to the received signal. The compensation circuit is coupled to the signal receiving line, generates a first compensation current according to driving currents of the display pixel circuits, generates a second compensation current according to sinking currents of the display pixel circuits, and generates a compensation signal according to the first compensation current and the second compensation current.

Based on the above, the compensation circuit provides the compensation signal to the signal receiving line according to the driving currents of the display pixel circuits. That is, noise on the signal receiving line caused by an image display operation of the display device can be compensated well, and performance of touch detection operation can be enhanced.

DETAILED DESCRIPTION OF DISCLOSED EMBODIMENTS

Figure 2:
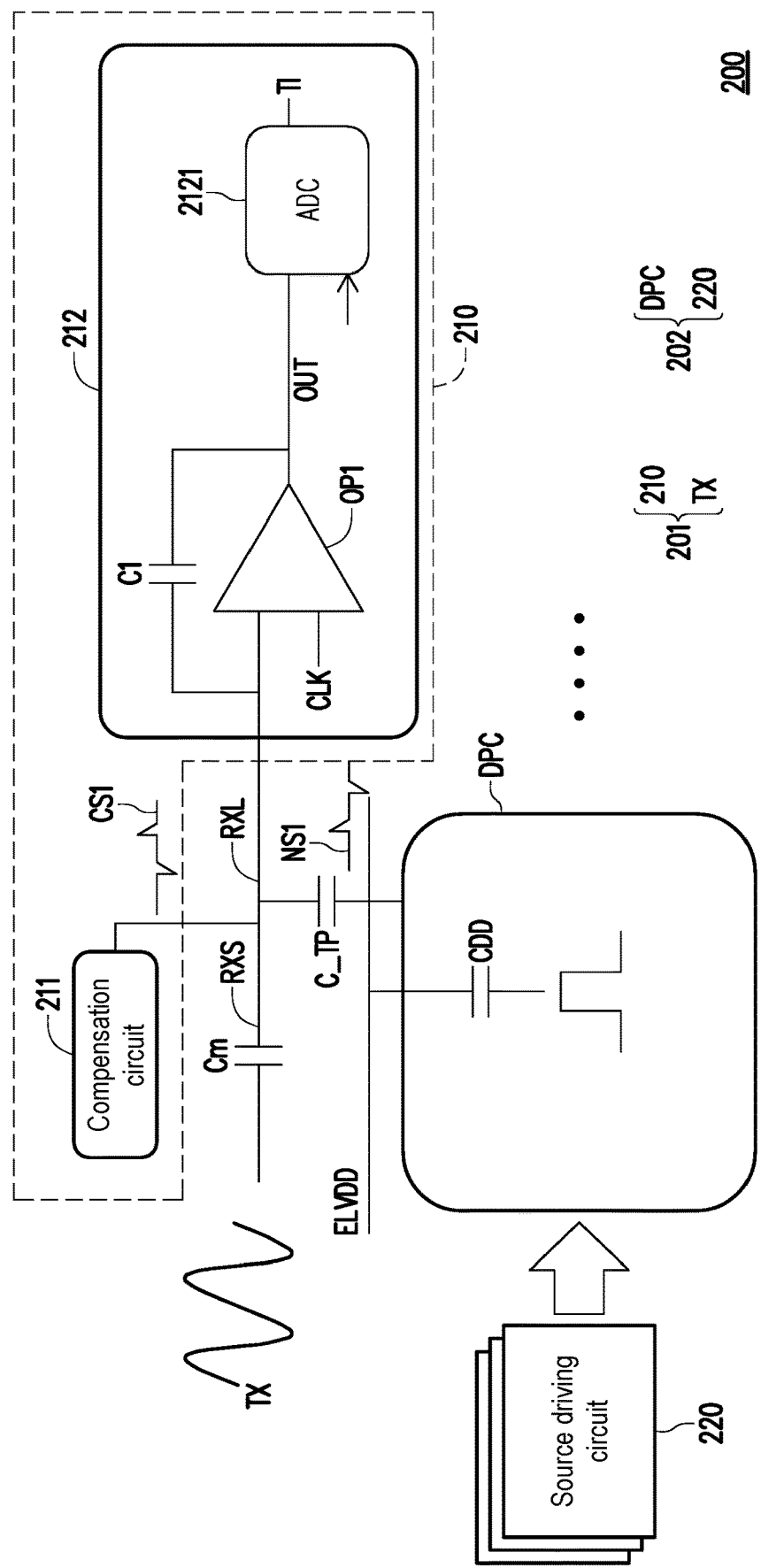
FIG. 2 illustrates a schematic diagram of a touch display device according to an embodiment of present disclosure.

Please refer to FIG. 2, which illustrates a schematic diagram of a touch display device according to an embodiment of present disclosure. The touch display device 200 includes a touch detection circuit 201 and a display device 202. The touch detection circuit 201 includes a signal receiver 210 and a signal transmitter TX. The signal receiver 210 is coupled to the signal transmitter TX through a signal receiving line RXL. The signal receiving line RXL is configured to receive a received signal RXS from the signal transmitter TX through a capacitor Cm. The signal receiver 210 receives the received signal RXS on the signal receiving line RXL. Furthermore, the signal receiver 210 is coupled to one or more display pixel circuits DPC through a capacitor C_TP.

In this embodiment, the signal receiver 210 includes the signal receiving line RXL, a compensation circuit 211 and a signal processing circuit 212. The signal processing circuit 212 is coupled to the signal receiving line RXL, and receives the received signal RXS on the signal receiving line RXL. The signal processing circuit 212 is configured to generate a touch detection information TI according to the received signal RXS. In detail, the signal processing circuit 212 includes an operation amplifier OP1, a capacitor C1 and an analog to digital converter (ADC) 2121. The capacitor C1 is coupled between one input end of the operation amplifier OP1 and an output end of the operation amplifier OP1. The capacitor C1 and the operation amplifier OP1 form a signal integrating circuit. Another input end of the operation amplifier OP1 receives a clock signal CLK, and the signal integrating circuit generates an output signal OUT by integrating the received signal RXS based on the clock signal CLK. The ADC 2121 receives the output signal OUT and converting the output signal OUT from analog format to digital format to generate the touch detection information TI.

On the other hand, the display device 202 includes one or more source driving circuits 220 and a plurality of display pixel circuit DPC. The display pixel circuit DPC are coupled to a power line ELVDD and the source driving circuit 220. When the display pixel circuit DPC perform a display operation, the source driving circuit 220 may charge or discharge a storage capacitor CDD, and a noise NS1 may be generated on the power line ELVDD. The noise NS1 on the power line ELVDD can be coupled to the signal receiving line RXL through a capacitor C_TP to interference the received signal RXS, wherein the capacitor C_TP is coupled between the power line ELVDD and the signal receiving line RXL.

For reducing the interference of the noise NS1, the compensation circuit 211 is disposed in present disclosure. The compensation circuit 211 is coupled to the signal receiving line RXL, and the compensation circuit 211 is configure to generate a compensation signal CS1 to reduce an influence of the noise NS1. In this embodiment, the compensation signal CS1 may be inverted to the noise NS1.

In detail, the compensation circuit 211 may generate a first compensation current according to driving currents of all the source driving circuits 220. Further, the compensation circuit 211 may also generate a second compensation current according to driving currents of all the source driving circuits 220. In here, the driving current generated by each of the source driving circuits 220 is used to charge the capacitor CDD of corresponding display pixel circuit DPC, and the sinking current generated by each of the source driving circuits 220 is used to discharge the capacitor CDD of corresponding display pixel circuit DPC. Each of the source driving circuits 220 can only generate one of the driving current and the sinking current at a same time.

The compensation circuit 211 may sum all the driving currents generated by the source driving circuits 220 to generate a first summing current, and generate the first compensation current by multiplying the first summing current with a first ratio. The compensation circuit 211 may also sum all the sinking currents generated by the source driving circuits 220 to generate a second summing current, and generate the second compensation current by multiplying the second summing current with a second ratio. In this embodiment, the first ratio and the second ratio are smaller than 1, and the first ratio and the second ratio may be same or different.

In this embodiment, the compensation circuit 211 may further generate the compensation signal CS1 by subtracting the second compensation current and the first compensation current.

Figure 1:
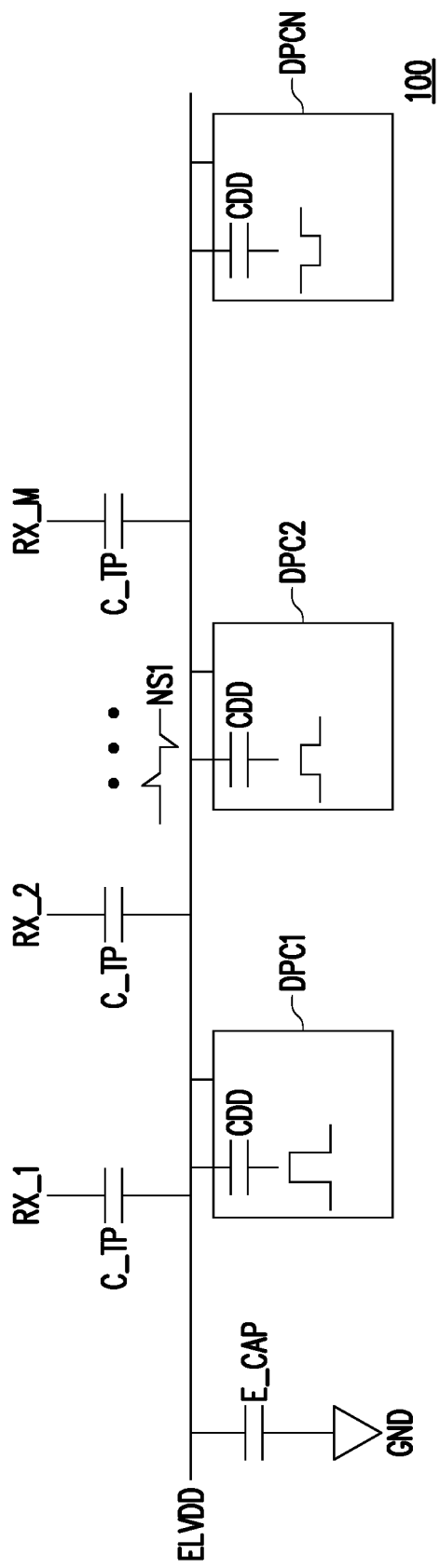
FIG. 1 illustrates a schematic diagram of a touch display device of prior art.

Please be noted here, by the description of FIG. 1 mentioned above, the noise N1 generated by the display pixel circuits DPC is cause by charging and/or discharging operations on the capacitor CDD of each of the display pixel circuits DPC. That is, the compensation circuit 211 emulates the charging and/or discharging operations of the source driving circuits 220 by summing the diving currents and sinking currents of the source driving circuits 220. The compensation circuit 211 generates the compensation signal CS1 which can be inverted to the noise NS1 by subtracting the second compensation current and the first compensation current.

Since the compensation signal CS1 is essentially inverted to the noise NS1, the interference of the noise NS1 can be reduced or eliminated by the compensation signal CS1. A performance of the touch detection operation of the touch detection circuit 201 may be enhanced.

It should be noted here, the display pixel circuit DPC may be a liquid crystal display (LCD) display pixel circuit, a light emitting diode (LED) display pixel circuit or an organic LED (OLED) display pixel circuit, and no special limitation here.

Figure 3:
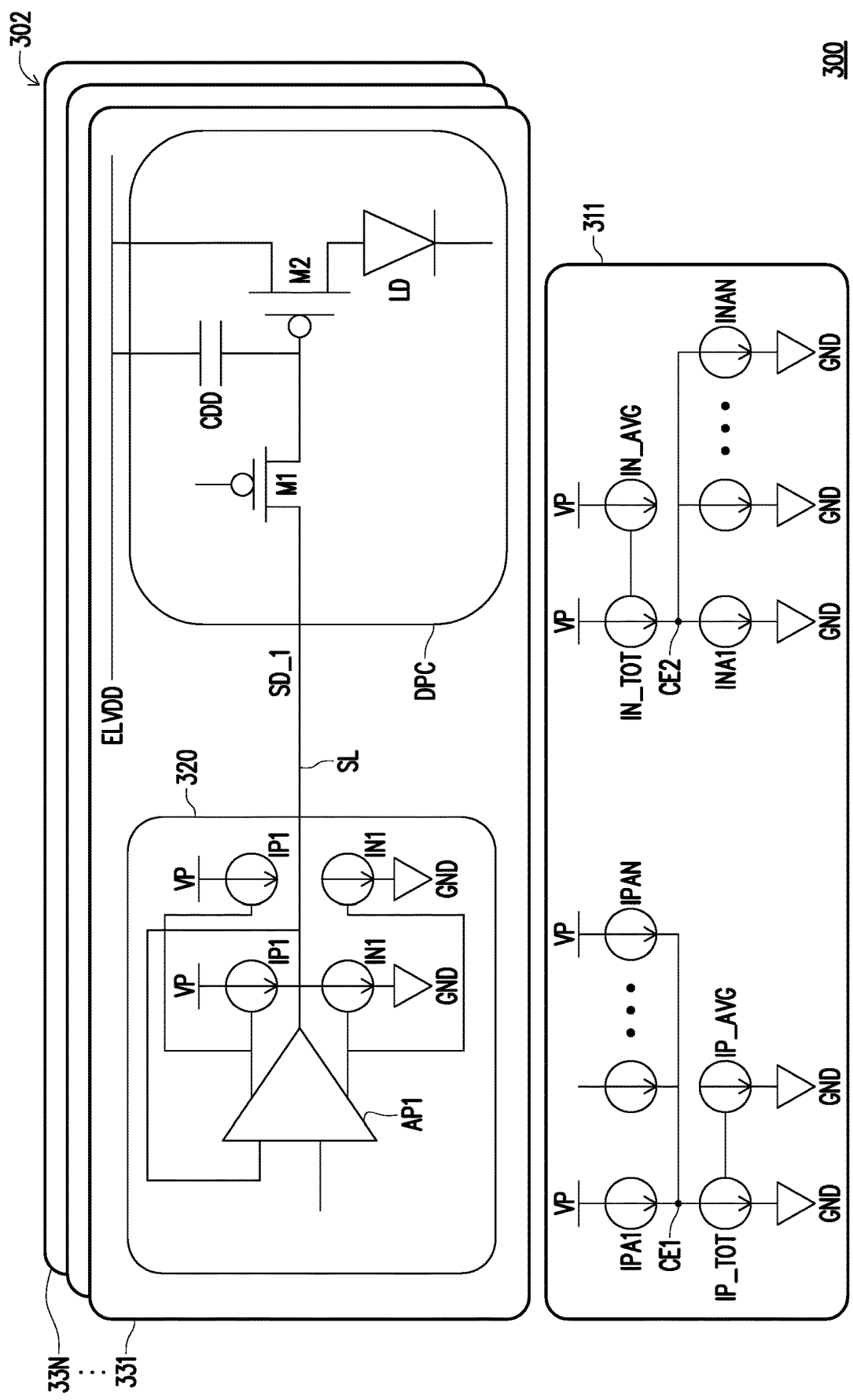
FIG. 3 illustrates a circuit diagram of a compensation circuit according to an embodiment of present disclosure.

Please refer to FIG. 3, which illustrates a circuit diagram of a compensation circuit according to an embodiment of present disclosure. A touch display device 300 includes a compensation circuit 311 and a display device 302. The display device 302 includes a plurality of display rows 331 to 33N, and each of the display rows 331 to 33N may include a source driving circuit 320 and a display pixel circuit DPC. In this embodiment, take a light emitting diode (LED) display as an example. The display pixel circuit DPC may includes transistors M1 and M2, a storage capacitor CDD and a LED LD. The transistor M1 is configure to a switch, and is used to provide a path for receiving a source driving signal SD_1 from the source driving circuit 320. The transistor M2 is configure to be a driving transistor, and is used to provide a driving current to light up the LED LD. The storage capacitor CDD is coupled between a gate of the transistor M2 and a power line ELVDD, and the storage capacitor CDD is used to store the source driving signal SD_1.

On the other hand, the source driving circuit 320 may include an amplifier AP1 and a plurality of current sources IP1 and IN1. In this embodiment, the current sources IP1 are coupled in parallel between a power voltage VP and a source line SL, and the current sources IN1 are coupled in parallel between the source line SL and a reference ground end GND. During a display operation, at least one of the current sources IP1 can be turned on to provide a driving current to the source line SL for generating the source driving signal SD_1, or at least one of the current sources IN1 can be turned on to provide a sinking current to the source line SL for generating the source driving signal SD_1. The driving current may be used to charge the storage capacitor CDD through the transistor M1 to increase a luminance of the LED LD1, and the sinking current may be used to discharge the storage capacitor CDD through the transistor M1 to decrease the luminance of the LED LD1.

In this embodiment, the compensation circuit 311 includes a plurality of current sources IPA1 to IPAN, INA1 to INAN, IP_TOT, IP_AVG, IN_TOT and IN_AVG. Each of the current sources IPA1 to IPAN respectively correspond to the current sources IP1 of the source driving circuit 320 of each of the display rows 331 to 33N. A circuit structure and electrical characteristics of each of the current sources IPA1 to IPAN is same as the corresponding current sources IP1. Moreover, each of the current sources INA1 to INAN respectively correspond to the current sources IN1 of the source driving circuit 320 of each of the display rows 331 to 33N. Also, a circuit structure and electrical characteristics of each of the current sources INA1 to INAN is same as the corresponding current sources IN1.

Output ends of the current sources IPA1 to IPAN are coupled to a first common end CE1, and the first common end CE1 may provide a first summing current of the current sources IPA1 to IPAN. On the other hand, output ends of the current sources INA1 to INAN are coupled to a second common end CE2, and the second common end CE2 may provide a second summing current of the current sources INA1 to INAN.

The current sources IP_TOT and IP_AVG form a first current mirror. The first current mirror coupled to the first common end CE1, and the current sources IP_TOT receives the first summing current through the first common end CE1, and the current sources IP_AVG generates a first compensation current by mirroring the first summing current. In this embodiment, the first current mirror provides a first ratio X1:Y1, wherein X1 may be smaller than Y1, and X1, Y1 are any real numbers. The current sources IN_TOT and IN_AVG form a second current mirror. The second current mirror coupled to the second common end CE2, and the current sources IN_TOT receives the second summing current through the second common end CE2, and the current sources IN_AVG generates a second compensation current by mirroring the second summing current. In this embodiment, the second current mirror provides a second ratio X2:Y2, wherein X2 may be smaller than Y2, and X2, Y2 are any real numbers. In this embodiment, X1/Y1 and X2/Y2 may be same or different. The compensation circuit 311 further generates a compensation signal by subtracting the second compensation current and the first compensation current.

In this embodiment, the first current mirror may be used to average the first summing current to generate the first compensation current, and the second current mirror may be used to average the second summing current to generate the second compensation current.

During the display operation, each of the current sources IPA1 to IPAN and correspond current source IP1 may provide same driving currents, and each of the current sources INA1 to INAN and correspond current source IN1 may provide same sinking currents. Such as that, the compensation circuit 311 may duplicate behavior of the source driving circuits 320 and generate the compensation signal inverted to the noise on the power line ELVDD. By applying the compensation signal to a signal receiving line, a noise coupled to the signal receiving line can be reduced or eliminated by the compensation signal.

Figure 4:
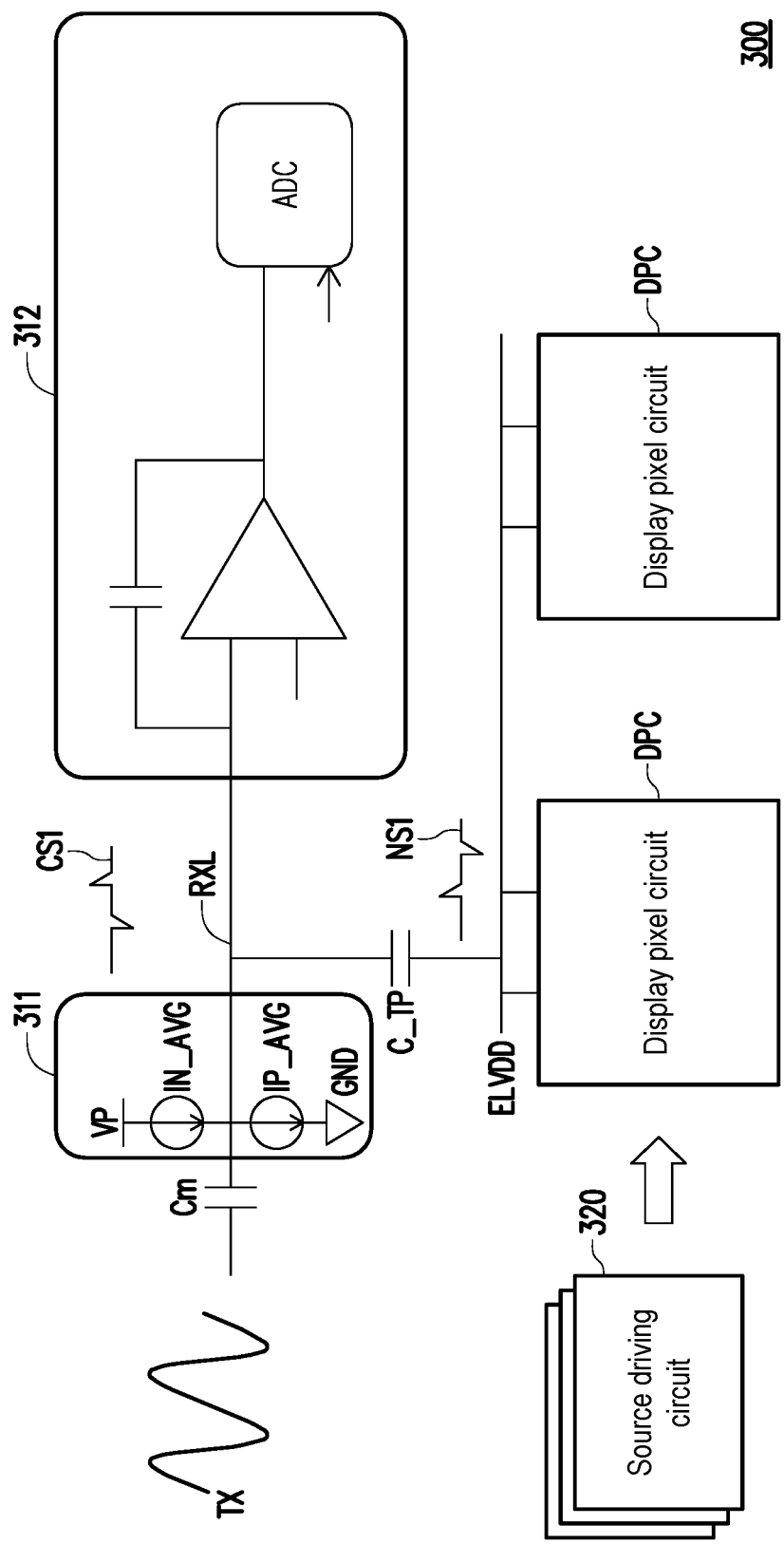
FIG. 4 illustrates a schematic diagram of a touch display device according to an embodiment of present disclosure.

Please refer to FIG. 4, which illustrates a schematic diagram of a touch display device according to an embodiment of present disclosure. The touch display device 300 includes a touch detection circuit and a display device. The touch detection circuit includes a compensation circuit 311, a signal processing circuit 312 and a signal receiving line RXL. The display device includes a plurality of source driving circuits 320 and a plurality of display pixel circuit DPC. Circuit structure of the touch display device 300 is same as the touch display device 200 in FIG. 2, and no more repeated description here.

It should be noted here, the compensation circuit 311 in FIG. 4 is a part circuit of the compensation circuit 311 in FIG. 3. In FIG. 4, the current source IN_AVG and the current source IP_AVG are coupled in series between the power voltage VP and the reference ground end GND. In detail, the current source IN_AVG is coupled between the power voltage VP and the signal receiving line RXL, and the current source IP_AVG is coupled between the signal receiving line RXL and the reference ground end GND. The current source IN_AVG is used to provide the second compensation current to the signal receiving line RXL, and the current source IP_AVG is used to draw the first compensation current from the signal receiving line RXL. That is, the compensation CS1 can be generated by subtracting the second compensation current and the first compensation current.

In summary, the signal receiver of the touch detection circuit provides a compensation circuit, and the compensation circuit can emulate charge and discharge behaviors of display pixel circuits to generate the compensation signal. The signal receiver applies the compensation signal essentially inverted to the noise on the signal receiving line of the signal receiver. Such as that the noise can be compensated and the signal processing circuit can receive the received signal with high accuracy. A performance of touch detection operation of the touch detection circuit can be enhanced.

What is claimed is:

1. A signal receiver of a touch detection circuit, comprising:
    a signal receiving line, receiving a driving signal through a first capacitor and coupled to a plurality of display pixel circuits through a second capacitor;
    a signal processing circuit, coupled to the signal receiving line, receiving a received signal on the signal receiving line and generate a touch detection information according to the received signal; and
    a compensation circuit, coupled to the signal receiving line, generating a first compensation current according to driving currents of a plurality of source driving circuits, generating a second compensation current according to sinking currents of the source driving circuits, and generating a compensation signal according to the first compensation current and the second compensation current.

2. The signal receiver according to claim 1, wherein the compensation circuit sums the driving currents to generate a first summing current, and generates the first compensation current by multiplying the first summing current with a first ratio.

3. The signal receiver according to claim 2, wherein the compensation circuit sums the sinking currents to generate a second summing current, and generates the second compensation current by multiplying the second summing current with a second ratio.

4. The signal receiver according to claim 3, wherein both the first ratio and the second ratio are smaller than 1.

5. The signal receiver according to claim 3, wherein the compensation circuit generates the compensation signal by subtracting the second compensation current and the first compensation current.

6. The signal receiver according to claim 3, wherein the compensation circuit comprises:
    a plurality of first current sources, coupled in parallel, the first current sources respectively providing a plurality of first currents, wherein each of the first currents is same as each of the driving currents of each of the source driving circuits, the first current sources commonly generate the first summing current;
    a first current mirror, coupled to the first current sources, and generates the first compensation current by mirroring the first summing current;
    a plurality of second current sources, coupled in parallel, the second current sources respectively providing a plurality of second currents, wherein each of the second currents is same as each of the sinking currents of each of the source driving circuits; and
    a second current mirror, coupled to the second current sources, and generates the second compensation current by mirroring the second summing current.

7. The signal receiver according to claim 6, wherein the first current mirror comprises:
   a third current source and a fourth current source, wherein the third current source receives the first summing current, and the fourth current source providing the first compensation current; and
   a fifth current source and a sixth current source, wherein the fifth current source receives the second summing current, and the sixth current source providing the second compensation current,
   wherein the sixth current source is coupled between a power voltage and the signal receiving line, the fourth current source is coupled between the signal receiving line and a reference ground voltage.

8. The signal receiver according to claim 7, wherein the sixth current source provides the second compensation current to the signal receiving line, and the fourth current source sinks the first compensation current from the signal receiving line.

9. The signal receiver according to claim 1, wherein the signal processing circuit comprises:
   a signal integrating circuit, coupled to the signal receiving line, generating an output signal by integrating the received signal; and
   an analog to digital converter, coupled to the signal integrating circuit, converting the output signal to a digital form and generates the touch detection information.

10. A touch display device, comprising:
   a display device, comprising a plurality of source driving circuits; and
   a touch detection circuit, comprising a plurality of signal receivers, wherein each of the signal receivers comprises:
      a signal receiving line, receiving a driving signal through a first capacitor and coupled to the source driving circuits through a second capacitor;
      a signal processing circuit, coupled to the signal receiving line, receiving a received signal on the signal receiving line and generate a touch detection information according to the received signal; and
      a compensation circuit, coupled to the signal receiving line, generating a first compensation current according to driving currents of the source driving circuits, generating a second compensation current according to sinking currents of the source driving circuits, and generating a compensation signal according to the first compensation current and the second compensation current.

11. The touch display device according to claim 10, wherein the compensation circuit sums the driving currents to generate a first summing current, and generates the first compensation current by multiplying the first summing current with a first ratio.

12. The touch display device according to claim 11, wherein the compensation circuit sums the sinking currents to generate a second summing current, and generates the second compensation current by multiplying the second summing current with a second ratio, both the first ratio and the second ratio are smaller than 1.

13. The touch display device according to claim 11, wherein the compensation circuit generates the compensation signal by subtracting the second summing current and the first summing current.

14. The touch display device according to claim 12, wherein the compensation circuit comprises:
   a plurality of first current sources, coupled in parallel, the first current sources respectively providing a plurality of first currents, wherein each of the first currents is same as each of the driving currents of each of the source driving circuits, the first current sources commonly generate the first summing current;
   a first current mirror, coupled to the first current sources, and generates the first compensation current by mirroring the first summing current;
   a plurality of second current sources, coupled in parallel, the second current sources respectively providing a plurality of second currents, wherein each of the second currents is same as each of the sinking currents of each of the source driving circuits; and
   a second current mirror, coupled to the second current sources, and generates the second compensation current by mirroring the second summing current.

15. The touch display device according to claim 14, wherein the first current mirror comprises:
   a third current source and a fourth current source, wherein the third current source receives the first summing current, and the fourth current source providing the first compensation current; and
   a fifth current source and a sixth current source, wherein the fifth current source receives the second summing current, and the sixth current source providing the second compensation current,
   wherein the sixth current source is coupled between a power voltage and the signal receiving line, the fourth current source is coupled between the signal receiving line and a reference ground voltage.

16. The touch display device according to claim 15, wherein the sixth current source provides the second compensation current to the signal receiving line, and the fourth current source sinks the first compensation current from the signal receiving line.

17. The touch display device according to claim 10, wherein the display device is a liquid crystal display (LCD) device, a light emitting diode display (LED) device or an organic light emitting diode display (OLED) device.

* * * * *